United States Patent [19]

Rogers et al.

[11] Patent Number: 5,208,646
[45] Date of Patent: May 4, 1993

[54] WHEEL ALIGNMENT SYSTEM

[75] Inventors: Steven W. Rogers; James L. Dale, Jr.; Hanford D. Monroe; Carl W. Pruitt; Sherman Paul, all of Conway, Ark.

[73] Assignee: FMC Corporation, Chicago, Ill.

[21] Appl. No.: 811,493

[22] Filed: Dec. 20, 1991

[51] Int. Cl.⁵ .......................... G01B 11/26; G01B 5/24
[52] U.S. Cl. ...................................... 356/152; 33/288
[58] Field of Search ........................ 33/288, 203.18; 356/155, 152

[56] References Cited

U.S. PATENT DOCUMENTS

| | | | |
|---|---|---|---|
| 4,239,389 | 12/1980 | Hollandsworth et al. | 356/155 |
| 4,319,838 | 3/1982 | Grossman et al. | 356/152 |
| 4,402,603 | 9/1983 | Lill | 356/152 |
| 4,594,789 | 6/1986 | Marino et al. | 33/288 |
| 4,761,749 | 8/1988 | Titsworth et al. | 364/559 |
| 5,014,227 | 5/1991 | Kling et al. | 364/559 |

OTHER PUBLICATIONS

"Lines", Lee Hunter, 1978.

Primary Examiner—Mark Hellner
Attorney, Agent, or Firm—H. M. Stanley; R. C. Kamp; R. B. Megley

[57] ABSTRACT

The disclosure herein relates to an alignment system and method which provides improved accuracy measurement of vehicle wheel alignment characteristics, guidance for an operator through known yet obscure adjustment procedures, an interface between system alignment sensors and the system controller which provides efficient handling of system generated data and system inputs and outputs, and live measurements and display of all alignment quantities so that interdependent changes between adjustable alignment quantities are observable.

36 Claims, 8 Drawing Sheets

FIG_1

FIG_1A

FIG_2

FIG_6

FIG_6A

FIG_3

FIG_4

FIG_5

FIG_7

FIG_7A

FIG_8

FIG_8A

FIG_9

FIG_9A

METERS  FRONT

FIG_10

ALPHANUMERIC  FRONT

| | | | |
|---|---|---|---|
| CASTER | +0.60 | 0.10 | +0.50 |
| CAMBER | −0.41 | 1.26 | +0.85 |
| TOE | +0.04 | +0.06 | +0.02 |
| INCLUDED ANGLE | —— | | —— |
| SAI OR IA | —— | | —— |
| SET BACK | | —— | |

FIG_11

FIG_12

FIG_13

WHEEL ALIGNMENT SYSTEM

SUMMARY OF THE INVENTION

A wheel alignment system is disclosed for measuring alignment angles of wheels which support a vehicle on a running surface which includes system function control means for providing system operating instructions and for receiving alignment angle data, angle sensing means mounted on at least two of the vehicle support wheels for providing angle measurement signals indicative of the angle between the planes of the support wheels and a reference direction, wherein the angle sensing means further includes improved response toe angle sensing means for providing substantially square wave angle measurement signal detection, whereby data update frequency is increased and angle sensing accuracy is improved. Additionally, interface control means is included for receiving the angle measurement signals and internal system control inputs and for providing bidirectional data flow between the angle sensing means and the system function control means. Further the system includes graphics array control and display means for receiving and displaying measured alignment angle data.

A toe angle signal sensing system is disclosed for detecting toe angle between the planes of a wheel pair supporting the vehicle for running on an underlying surface wherein a plurality of light beams having a predetermined carrier frequency is projected at known successive times and at known angles to the plane of one of the wheel pair, and a light beam receiver is mounted in known position and in the path of the plurality of light beams and producing an angle signal output indicative of reception of ones of the light beams. The combination includes high pass filter means connected to receive the angle signal output and having a pass band substantially above ambient light noise frequencies and including the carrier frequency for providing a high pass output relating to the angle signal output. Also, means is provided for detecting the high pass output and for storing a signal indicative of the amplitude thereof together with control means for receiving and for erasing the stored signal indicative of amplitude before the next successive light beam is sensed by the light beam receiver.

A method is disclosed for adjusting the track of a pair of wheels to a predetermined angle wherein the wheels are connected by a solid axle supported by spaced spring assemblies attached to the axle by shackles extending through holes in a shackle plate. The process includes the steps of measuring the wheel track angle, calculating an adjustment angle between the wheel track and the predetermined wheel track angle, measuring the distance between the spaced spring assemblies, and computing an elongation dimension and direction for the holes in the shackle plate as the product of the distance and the sine of the adjustment angle.

In another aspect of the invention a method is disclosed for simultaneously adjusting camber and caster of a wheel on a vehicle to a specified value wherein the wheel assembly is pivotally carried on the vehicle by a member having a particular geometry which is attached to the vehicle body by forward and rear adjustable attachment points, and wherein measurement instruments provide caster and camber measurements. The process includes the steps of initially adjusting the position of one of the forward and rear adjustable attachment points, sensing the effect of the step of initially adjusting on camber and caster measurement, predicting the effect of subsequent adjustment at the other of the forward and rear adjustable attachment points by using the effect from the sensing step, and calculating the adjustments at each of the forward and rear adjustable attachment points to obtain the specified values of caster and camber for any particular geometry of the member which pivotally carries the wheel.

A method of adjusting alignment of a laterally disposed pair of independently suspended wheels on a vehicle is disclosed wherein the wheels have alignment measurement instruments in communication therewith for measuring wheel alignment characteristics of the pair of wheels and wherein the wheels are carried by support structure connected together by a rigid member extending therebetween. The method includes the steps of measuring the camber and steering axis inclination alignment characteristics for each of the pair of wheels, comparing the measured alignment characteristics for each wheel of the pair for indication of lateral shift of the rigid member, and adjusting the lateral position of the rigid member in the direction which moves steering axis inclination and camber measurements in both of the pair of wheels toward specification values if indication exists that the rigid member has shifted.

Further, a method is disclosed for adjusting steering axis inclination, included angle and camber of wheels suspended from and supporting a vehicle for running on an underlying surface while the wheel is raised above the underlying surface, wherein alignment measurement instruments are coupled to the wheel for providing alignment angle output, and wherein brakes are locked and the alignment measurement instruments are locked to prevent rotation relative to the wheel during known portions of the process, including the steps of steering the wheels straight ahead and storing the camber measurement while the vehicle is set down on the underlying surface. Further, the method includes the steps of raising the vehicle above the underlying surface, measuring the camber output when the vehicle is raised, calculating the difference between the camber outputs with the vehicle lowered and raised, steering the wheel through a known angle in a left direction, storing a steering axis inclination alignment angle left turn output, steering the wheel through a known angle in a right direction, storing a steering axis inclination alignment angle right turn output, calculating the steering axis inclination angle from the left and right turn outputs, calculating a modified steering axis inclination angle output using the difference between camber outputs lowered and raised, storing the modified steering axis inclination angle output and adjusting camber and steering axis inclination outputs in the raised condition using the stored modified steering axis inclination output and the stored camber measurement output obtained when the wheel was set down.

In yet another aspect of the invention an alignment display is disclosed for showing alignment characteristics of wheels on a vehicle which includes a graphics array control means and a live display of all quantities being aligned connected to said graphics array control means so that all interdependent changes in quantities relating to alignment characteristics caused by alignment adjustments are displayed.

DESCRIPTION OF THE PREFERRED EMBODIMENTS

Figure 2:
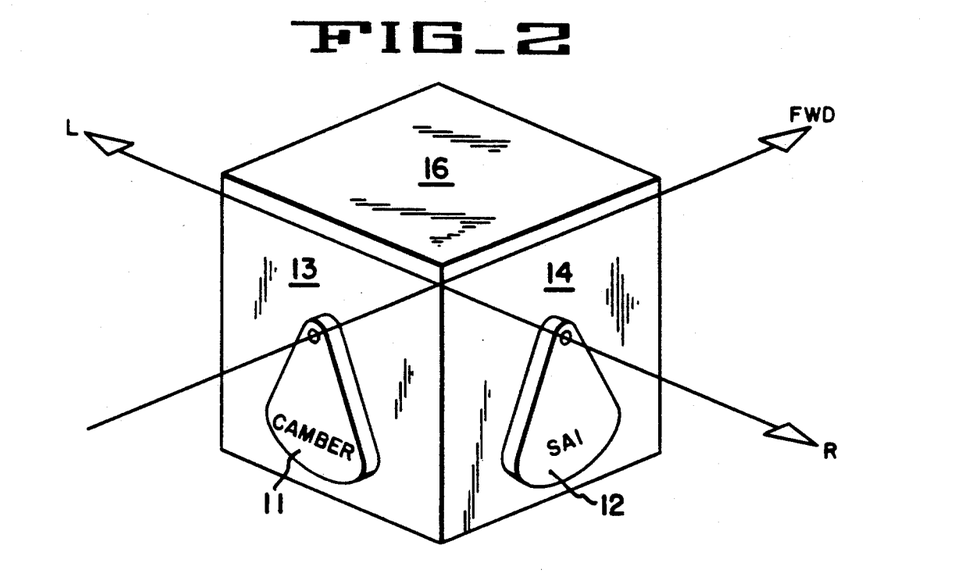
FIG. 2 is a perspective view showing the relative mounting positions for the camber and steering axis inclination inclinometers.

The wheel alignment system disclosed herein is capable of measuring alignment characteristics for all four wheels which serve to support a vehicle on an underlying surface. The importance of proper wheel alignment is well known and discussion thereof will not be undertaken here. A wheel alignment system with which the improvements disclosed herein would be useful is disclosed in U.S. Pat. No. 4,761,749 for a Vehicle Wheel Alignment Apparatus and Method, Titsworth et al. currently assigned to the assignee herein. As shown in the Titsworth et al patent, a wheel alignment system is disclosed for aligning the wheels on a four wheel vehicle wherein the system includes alignment heads for mounting on each of the four wheels for obtaining wheel alignment data relating to the wheel on which mounted and a system console for receiving and conditioning the data and for storing and/or displaying the data as appropriate. The sensors for measurement of the alignment quantities by each wheel mounted alignment head include inclinometers 11 and 12 mounted in orthogonal planes 13 and 14 as seen in FIG. 2 of the drawings herein. Plane 13 is a vertical plane disposed laterally of the wheels supporting the vehicle and plane 14 is a vertical plane disposed longitudinally of the supporting wheels. FIG. 2 shows these relationships in addition to the illustration of a third orthogonal plane 16. Plane 13 is known as a camber, steering axis inclination and included angle plane, whereas plane 14 is known as the caster plane because the mentioned measurements are projected in these planes. Plane 16 is known as the toe plane in which toe measurements for the four wheels are taken.

Figure 1:
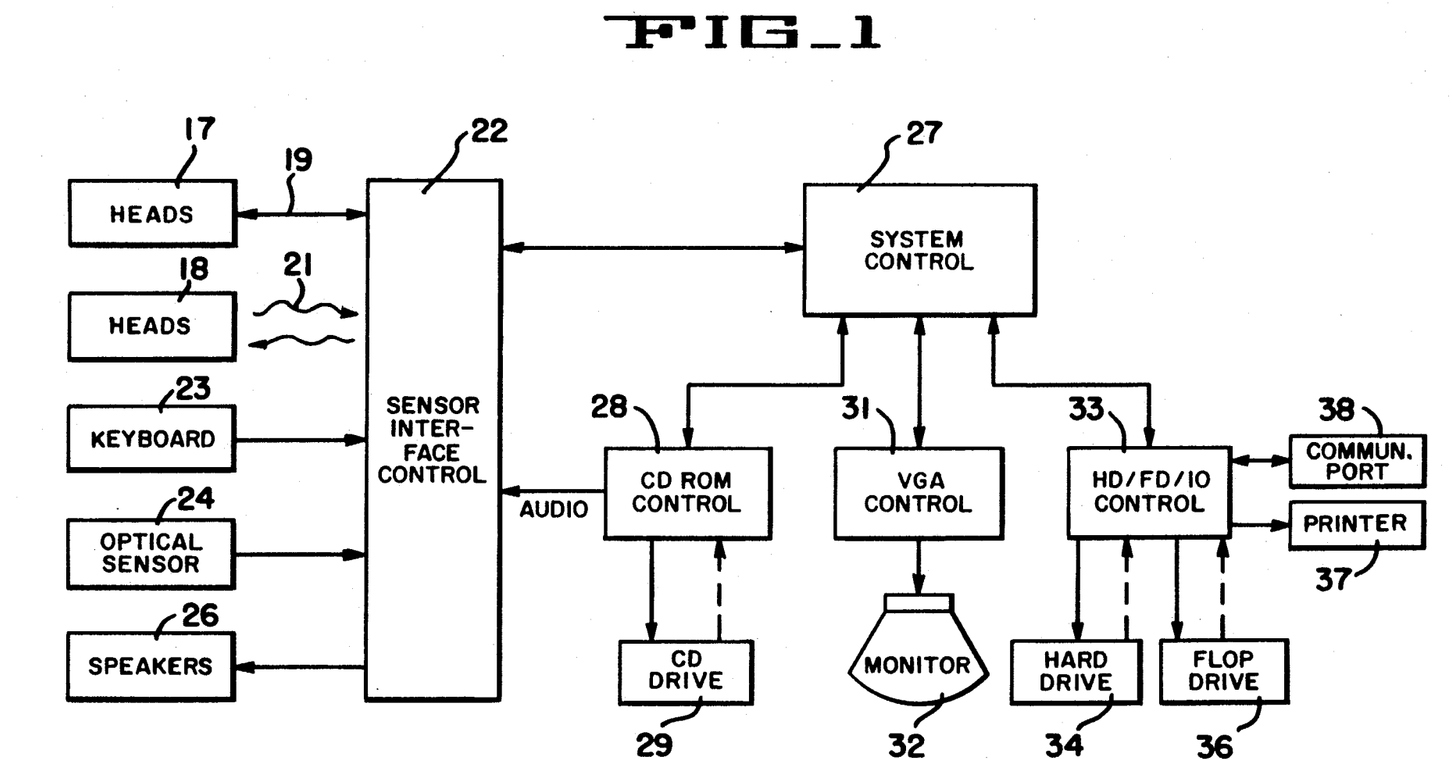
FIG. 1 is a block diagram of the disclosed invention.

FIG. 1 shows two blocks 17 and 18 labeled "heads". These blocks indicate the individual wheel mounted alignment heads which carry the alignment angle measuring instruments such as the camber inclinometer 11 and the steering axis inclination inclinometer 12. The wheel mounted alignment heads also include toe measuring apparatus which is disclosed in principle in the aforementioned Titsworth et al patent as well as in U.S. Pat. No. 4,180,326, Chang, also assigned to the assignee herein. As also seen in FIG. 1, heads 17 and 18 may be connected either by connecting cords 19 or by infrared or RF data transmission 21 to a sensor interface control section 22 of the disclosed alignment measurement system. A keyboard 23, an optical system control sensor 24 and an audio speaker 26 are also connected to the sensor interface control section. A system control 27 is also shown. The sensor interface control 22 acts as an intermediary for digital and analog system inputs, serial communications of data, and system digital or control outputs between system control 27 and the components 17, 18, 23, 24, and 26. System control 27 includes RAM, ROM, a keyboard control, a microprocessor and associated logic interfaces and computer architecture.

It should be noted that a general purpose computer such as is included in the system control 27 is not designed for fast data acquisition and processing. One to four serial input data ports are common which requires reading, storing and calling the data in multiplex fashion. This is a relatively slow process. The sensor interface control 22 receives data from the system sensors and preprocesses the data for presentation to a system display so that immediate data display is attainable. This relieves the system control 27 from the hard work of converting and processing raw data from the system sensors and leaves it to do other more mundane tasks such as computing alignment quantities, conducting calibration, running an expert system, etc. Thus, the sensor interface control 22 provides a well defined, high speed performance function between the system control 27 and the assorted alignment sensors and controls contained in the alignment system.

Figure 1A:
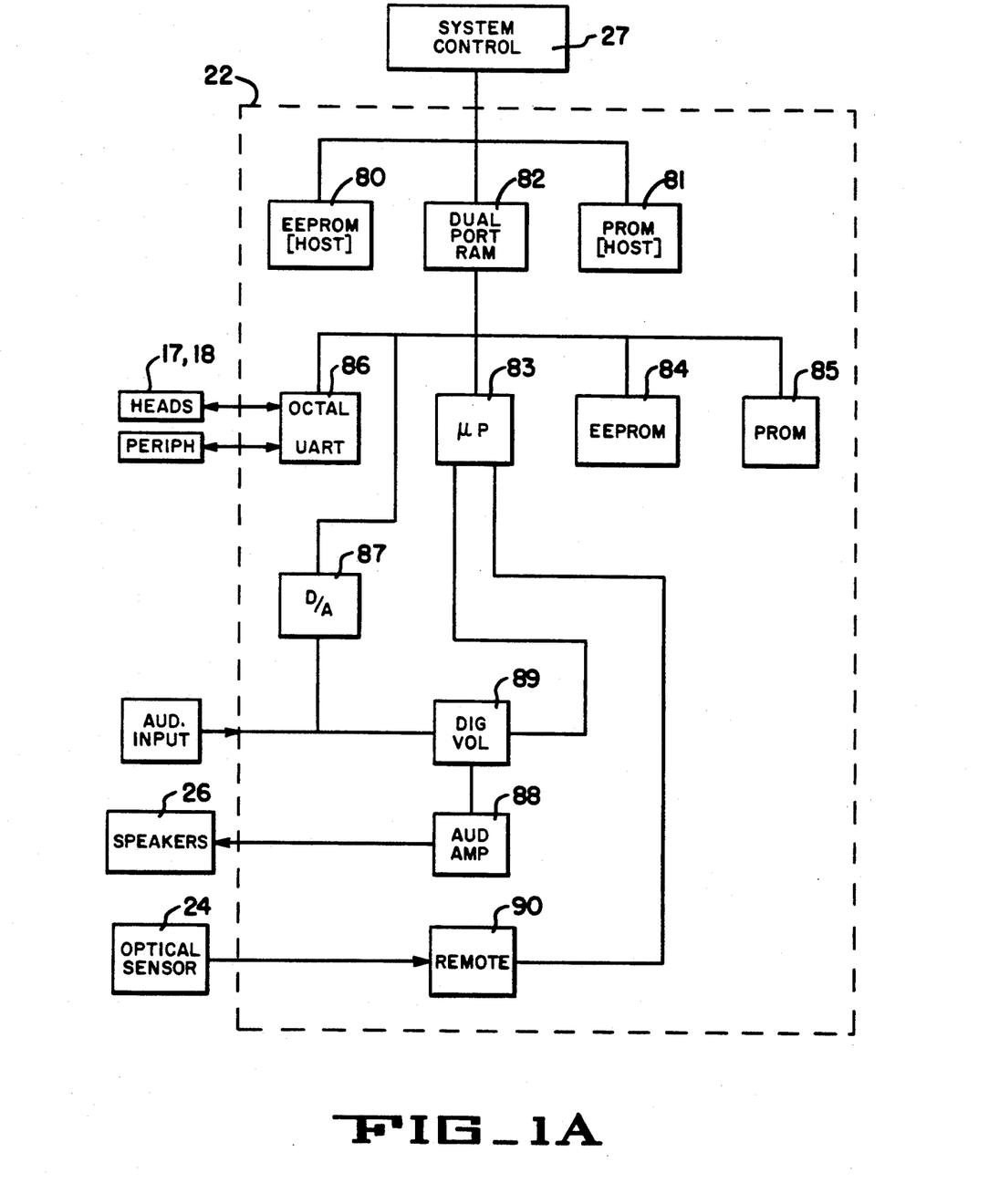
FIG. 1A is yet another block diagram of the disclosed invention.

As may be seen by reference to FIG. 1A, the sensor interface control 22 contains electrically erasable programmable read only memory 80 (EEPROM) and programmable read only memory (PROM) 81 for use by the host computer only. Dual port random access memory 82 (RAM) is present to provide for communication between an interface microprocessor 83 and the system control 27. The Hitachi HD 6475328 serves in the interface microprocessor capacity. The interface board has, in addition to the RAM, EEPROM 84 for receiving downloadable programs and calibration factors and PROM 85 for containing the main operating program.

An octal UART (universal asynchronous receiver-transmitter) 86 provides eight communications channels which are programmable. These channels are used to communicate with remote sensors such as those in the heads 17/18 or any peripheral equipment associated with the alignment system. Data may be sent as well as received on these channels. A digital to analog converter 87 is connected to an audio amplifier 88 through a digital volume control 89 is which is an electrically erasable potentiometer. A wide range of sounds may be produced therefor by the microprocessor 83 and additionally external audio inputs may be processed for audio output.

The sensor interface control 22 receives analog or digital sensor outputs and provides digital output control signals. Software may be downloaded through the dual port RAM 82 to the EEPROM 84 which provides ease in field upgrades without changing integrated circuit components in the system. A remote control receiver section 90 is provided to receive digital outputs from the optical sensor 26 or other digital inputs to the alignment system.

FIG. 1 also shows a compact disc (CD) ROM control 28 which is connected to the system control 27. The CD ROM control is connected to a CD drive 29 which mechanically provides for disc scanning. Audio output from a CD disc is provided to the sensor interface control 22 which provides for audio signals to the speakers 26 in accordance therewith.

A TM video graphics array (VGA) control 31 is connected to the system control 27 and is directed by the system control to provide displays on a monitor 32. Also connected to the system control 27 is a hard disc, floppy disc and input/output control 33. Control 33 directs a hard disc drive 34 and a floppy disc drive 36 which provide further input to the system. Control 33 also regulates a printer 37 and an input/output communication port 38.

Figure 3:
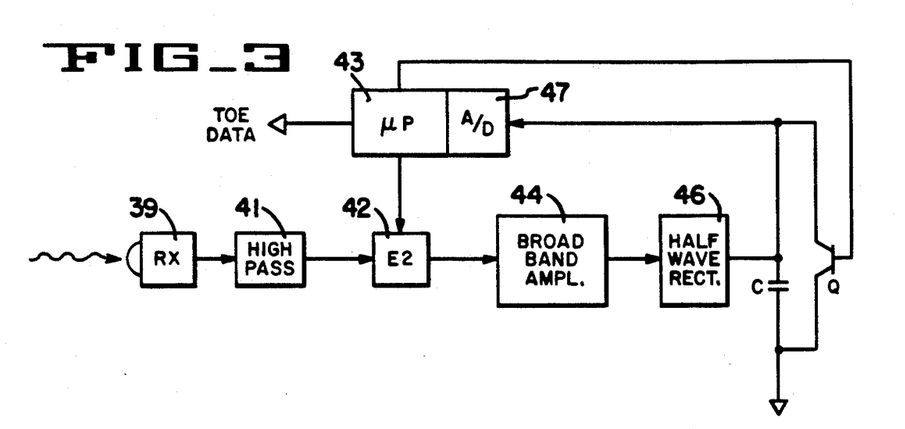
FIG. 3 is a block diagram of the toe measuring circuit of the present invention.

While the inclinometers 11 and 12 provide vertical reference for certain wheel alignment measurements, toe measurement is taken in the plane 16 of FIG. 2 and reference is made to FIG. 3 of the drawings herein for description of the toe measurement improvements disclosed in this application. As disclosed in the patents referenced heretofore, structure is provided for projecting a plurality of light beams having a predetermined carrier frequency at a succession of known time instants and with known angular orientation relative to the plane of a wheel on which such a projector is mounted. A light beam receiver 39 is shown in FIG. 3 which receives those of the light beams which are within the receiver's field of view. The light beam carrier frequency is about 16,000 hertz and the received beam is identified by its known time of transmission. Therefore, the angle of the projected beam from the wheel plane on which the projector is mounted is known. As a result, the angle of the plane of the wheel on which the projector is mounted is known relative to a reference direction when the received light beam signals are analyzed to determine which beams are the most directly impinging ones of the plurality of beams.

The receiver 39 receives from three to five of the projected light beams at any one time. As seen in the lower portion of FIG. 4 of the drawings, the light beam represented by the 16,000 hertz carrier frequency starting at time t1 is not the primary or most directly impinging beam. While the light beam which is turned on at time t4 is closer to directly impinging on the receiver 39, it is the beam which comes on at time t8 which is the primary beam impinging on receiver 39. This is seen by the higher amplitude of the received signal which is best seen in the substantially square wave representations in the upper part of FIG. 4 from time t9 to time t10 at a signal level of V3.

The received signal at receiver 39 containing the 16,000 hertz carrier is connected to a high pass filter 41 which removes low frequency light noise. The received signal including the 16,000 hertz frequency is well above the knee of the response of the filter and well into the pass band. The filtered signal containing the 16,000 hertz received light beam signal is connected to a variable amplifier which finds the most directly impinging or primary light beam. The variable amplifier includes an electrically controlled potentiometer 42 at the input which is controlled by a microprocessor 43 in the toe signal sensing and control circuit. The electrically controlled potentiometer 42 is connected to the input of a broad band amplifier 44 to control the gain thereof. The gain is fixed for the first scan of the signals generated by received light beams. Each signal is digitized and stored, as will be hereinafter described. The highest stored signal from the first scan is selected. If the gain of the amplifier does not place the highest received signal within about a 2 to 4½ volt window, the microprocessor calculates a new amplifier gain and controls the electrically controlled potentiometer 42 to adjust the amplifier gain to a value so that the highest amplified output is within the window. The remaining signals received are then amplified at the new fixed value and achieve lesser values as seen in the lower part of FIG. 4, depending on how obliquely they strike the sensor 39. The electrically controlled potentiometer 42 is available as Model X9CMME from Xicor, Milpitas, Calif. This feature allows the toe circuit to handle cross toe and track toe light beam reception while optimizing the gain for each of the cross and track toe measurements to thereby provide more readily interpretable measurement signals.

Figure 4:
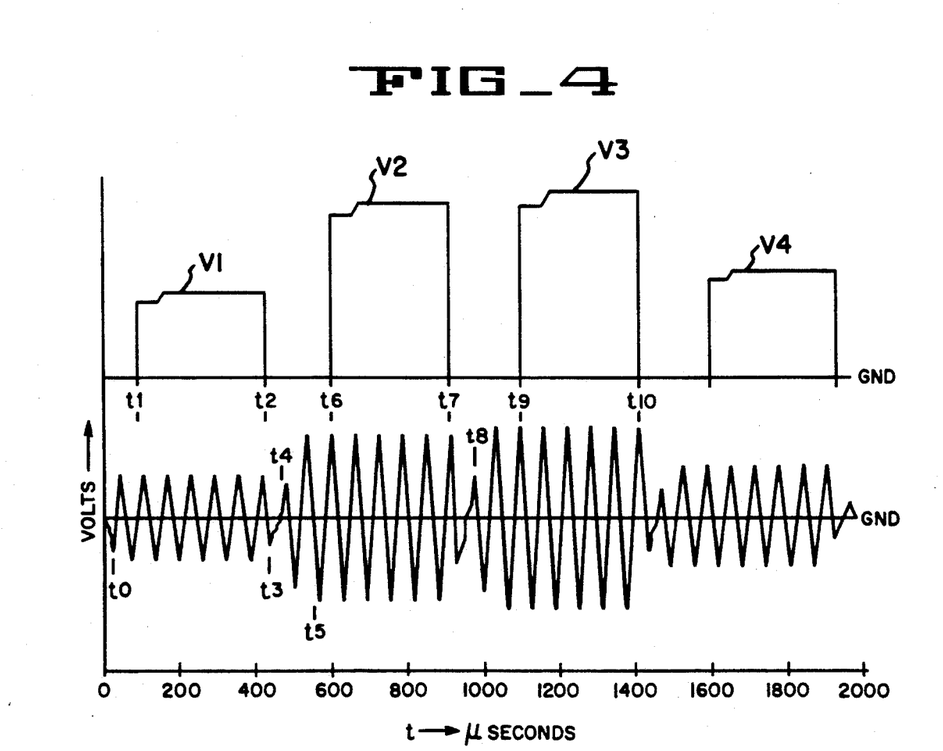
FIG. 4 is a diagram relating to detection of the signal produced by the apparatus of FIG. 3.

A detector circuit 46 half wave rectifies the filtered and amplified 16,000 hertz output from the receiver 39 so that only the one half of the signal seen in the lower portion of FIG. 4 remains. The half wave rectified signal is stored on a capacitor C in FIG. 3 as represented by the signal amplitudes V1, V2, V3 and V4 in FIG. 4. It may be seen that the high pass filter 41 presents an amplified signal to the detector 46 which is amplitude sampled by the holding capacitor C within fewer than 3 cycles of the carrier frequency. The period of 1 cycle is 62.5 microseconds. Thus, the full amplitude of the signal resulting from a received light beam signal is sensed at capacitor C in less than 200 to 250 microseconds. As a result, the stored signals V1, V2, V3 and V4 in the upper half of FIG. 4 nearly resemble square waves. The substantially square wave which exists from time t9 to time t10 in FIG. 4 results from the most directly impinging light beam on receiver 39 and therefore, taken with the signals resulting from light beams received adjacent in time (signals V1, V2, V4), is indicative of the angle of the plane of the wheel on which the light projector is mounted relative to a predetermined reference direction.

The circuit of FIG. 3 has a transistor Q connected accross the storage capacitor C. When the microprocessor causes the transistor to conduct, the charge is immediately dissipated from the storage capacitor. In this fashion, the capacitor is available to store a new signal generated by the next received light beam.

The manner in which the circuit of FIG. 3 functions will now be described in conjunction with the diagram of FIG. 4. A first light beam is received by receiver 39 at a time t0 (FIG. 4) and the transistor Q is placed in a nonconducting condition at t1 by the microprocessor 43. The capacitor C is charged by the 16,000 hertz signal to voltage amplitude V1 within about 3 cycles and a substantially square wave begins at time t1. The voltage V1 is digitized by an analog to digital (A/D) converter 47 and transferred to microprocessor 43. At time t2 the transistor is caused to conduct by the microprocessor 43 and the square pulse at V1 is terminated (upper part of FIG. 4). The first light beam is shut off at about time t3 (lower part FIG. 4). At time t4 the next light beam is turned on and at time t5 microprocessor 43 places the clamping transistor Q in a nonconducting condition. The signal resulting from the receipt of the next light beam begins to be stored on the capacitor C at time t6 reaching the full value of amplitude V2 within a few cycles of the carrier frequency and is held on the capacitor C as a substantially square wave. The signal V2 is connected to the A/D converter 47 digitized and passed to the microprocessor 43 for storage and use in accordance with the operating program for the aligner. At time t7 when the microprocessor 43 causes the clamping transistor Q to conduct, capacitor C is discharged.

The second received light beam is turned off shortly thereafter and the third light beam to be received is turned on at time t8. The clamping transistor Q is taken out of the conducting mode by microprocessor 43 and the capacitor C begins to charge at time t9. Voltage V3 is obtained in the same fashion as voltages V1 and V2. The sampled voltage amplitude is provided to the analog to digital converter 47 which provides a digital value to the microprocessor 43 corresponding to the amplitude V3. This process is performed for each signal caused by receipt of one of the plurality of light beams. As a result the signal levels may be updated often by the microprocessor which enhances the probability for accurate measurement by the system.

The high pass filter 41 improves the time response of the toe detecting circuit so that an accurate amplitude measurement of the signal produced by a received light beam is detected in less than 250 microseconds. Formerly the toe detection system contained a band pass filter and required about 2500 microseconds to detect the signal produced by a received light beam. As a result, data update frequency was limited. It is now possible to update the data in the system more often and therefore get smoother and more accurate detection. The smoother or cleaner signal detected allows conversion to a 10 bit digital number, whereas previously an 8 bit digital number was obtained. This provides an accuracy improvement by a factor of 4 (from 256 to 1024).

Figure 5:
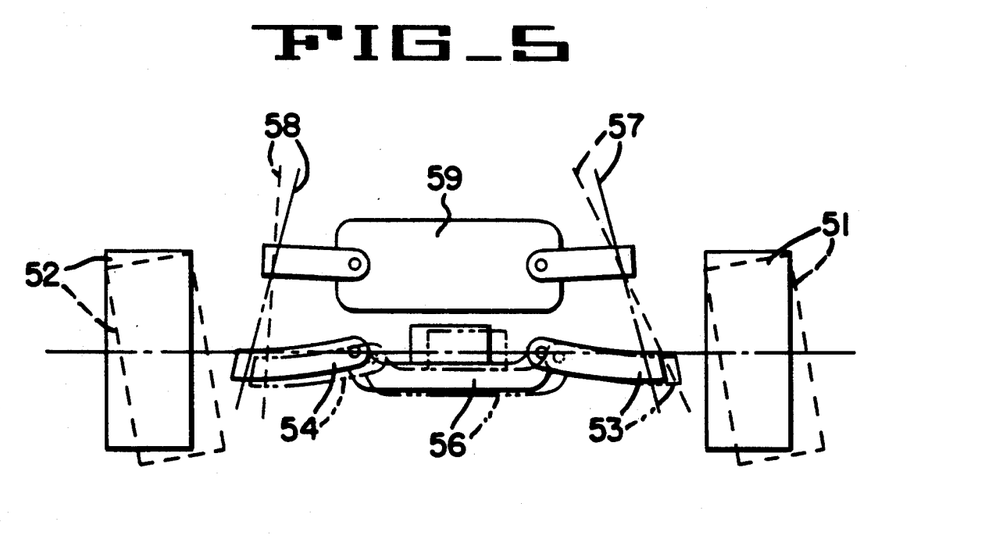
FIG. 5 is a front elevation diagram illustrating cradle shift.

It occasionally occurs that structure on a vehicle located between two independently suspended wheels may shift laterally causing an out of alignment condition at the wheels. It is useful to detect when such a shift may have occurred and to consider repositioning the shifted member prior to adjusting wheel alignment, thereby making the adjustments much smaller and therefore easier to obtain the specified alignment values. For example, with reference to FIG. 5, a pair of independently suspended front wheels 51 and 52 are shown in dashed lines attached to lower support members 53 and 54 extending inwardly from the wheels. The actual attachment is omitted to provide clarity in the drawing figure. Attached between the inward ends of the lower support members 53 and 54 is a rigid member, in this case an engine cradle 56. In dashed lines the lower support members and the cradle are shown shifted to the right in FIG. 5 so that the camber of the left wheel in the figure is positive and the camber of the right wheel in the figure is negative. As shown, steering axis inclination 57 for the left wheel in the Figure is negative and steering axis inclination 58 for the right wheel is positive. The upper attachment point which defines the steering axis inclination on each side of the vehicle is seen to be stable and attached to the vehicle body 59. It may be seen that it would be difficult to align the wheels in this condition to obtain specified camber and steering axis inclination values. The condition depicted in FIG. 5 generally occurs as a result of an impact the vehicle has experienced and should be corrected prior to attempting adjustment of the wheels to obtain specified alignment values. In this instance, appropriate bolts or fasteners are loosened and a pry bar is utilized to move the cradle 56 laterally to the left in FIG. 5 to assume its normal neutral position shown by solid lines. As a result the wheels 51 and 52 assume a neutral camber position from which position adjustment for specified wheel camber will be much easier. Also the steering axis inclinations 57 and 58 have assumed a more normal position in solid lines from which adjustments for steering axis inclination or included angle may be readily obtained. If the camber is different from side to side and if the steering axis inclination readings are different from side to side on the vehicle and if the differences are opposite in sign and about the same magnitude cradle shift is indicated and it would be appropriate to adjust the lateral position of the cradle prior to attempting additional wheel alignment adjustments. Thus, the camber and steering axis inclination values may be inspected for any pair of independently suspended wheels to see if it would be appropriate to adjust the lateral position of a rigid connecting member extending between the wheels.

Figure 6:
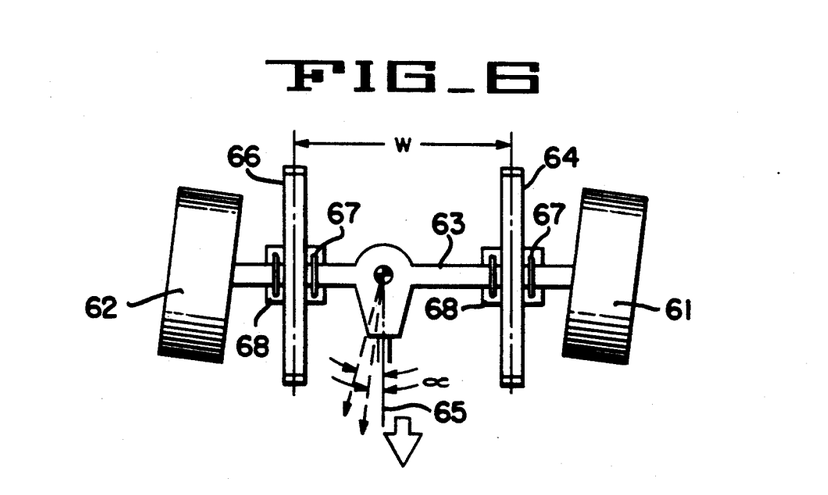
FIG. 6 is a plan view of a pair of vehicle supporting wheels connected by a solid axle.

FIG. 6 shows a pair of vehicle supporting wheels 61 and 62 connected by a solid axle 63. The solid axle is suspended from a chassis by a pair of springs 64 and 66 which are attached to the chassis at either end. The axle 63 is attached to the springs 64 and 66 by means of spring shackles 67 which surround the solid axle and are attached to shackle plates 68 fastened to the springs 64 and 66. The vehicle geometrical centerline 65 is defined by a line through the midpoints between a front wheel pair and a rear wheel pair. If the planes of the wheels 61 and 62 are not parallel to the centerline 65 then the entire axle 63 and wheel assemblies must be shifted through the angle $\alpha$, as shown in FIG. 6.

In order for a mechanic to shift the axle without several iterative steps, the system can predict for him the amount of adjustment of the shackle plates that will be necessary. In this manner he can elongate the mounting holes an appropriate amount, and with one iteration shift the axles and the rolling direction of the wheels into true alignment with the vehicle centerline.

Figure 6A:
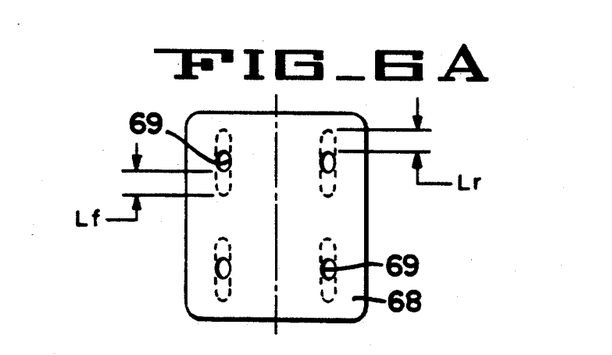
FIG. 6A is a plan view of a spring shackle plate.

The adjustment of the wheels 61 and 62 in FIG. 6 may be done by the system disclosed herein by measuring the total toe between the wheels 61 and 62 and bisecting the total toe to obtain the wheel rolling direction track which forms the angle $\alpha$ with the geometric vehicle centerline 65. The distance W between the springs 64 and 66 is known or measured. The calculation $L = W \sin \alpha$ is then performed where L is the elongation of holes 69 in FIG. 6A. By finding the dimension L and elongating the holes in one of the shackle plates 68 by that dimension, solid axle wheels 61, 62 attached thereto may be shifted to an angle so that the wheel rolling direction is now aligned with the geometric centerline 65. It should be noted that dimension L for elongation of the hole 69 could be applied one-half on one side and one-half on the opposing side whereby the same correction to the wheel track could be obtained. The dimension L is shown in FIG. 6A as extending in one direction from the hole 69 for one sense of rotation and in the opposite direction from hole 69 for the opposite sense of rotation of the rolling direction of the wheels 61 and 62. It is apparent that the elongation to correct the condition of FIG. 6 must be made in the left side shackle plate 68, with hole 69 elongated rearwardly as shown for $L_r$ in FIG. 6A. Alternatively the condition of FIG. 6 could be corrected by elongating the holes 69 by one half $L_r$ in the left shackle plate and by one half $L_f$ (forwardly) in the right shackle plate.

The alignment system disclosed herein may be used to adjust camber, steering axis inclination and/or included angle (the angle between steering axis inclination and camber) while the vehicle is raised and while the display shows values corresponding to values which would exist while the vehicle wheels were set down on an underlying surface. Previously it has been the practice to raise the vehicle, measure for steering axis inclination by a steerable wheel swing and calculation, to lower the vehicle, look at the change in the camber reading from raised to lowered and correct the steering axis inclination with the change in the camber reading. As proposed herein, the steering axis inclination, included angle and camber measurement may be obtained by steering the steerable wheels straight ahead and storing the camber reading from the camber inclinometer (item 11 in FIG. 2). It is normal procedure to then lock the brakes and lock the heads rotationally on the wheels and to raise the vehicle off the underlying surface. At this point the change in camber reading is observed and stored as delta camber. The steering axis inclination is measured with the wheels raised by swinging from a known left steering angle, taking a reading from the steering axis inclination inclinometer (item 12 in FIG. 2), steering through a known right turn, and taking another steering axis inclination inclinometer reading. The steering axis inclination is calculated from the left and right readings as in known to those of skill in this art. Thereafter, a modified steering axis inclination, and included angle value is calculated using the delta camber value stored after the vehicle was raised. The modified steering axis inclination and included angle value is stored. The wheels are steered straight ahead and the camber reading (already known from the reading before the vehicle was raised) is retrieved. At this point the camber and steering axis inclination readings exist as if the vehicle was set down on an underlying surface. The readings are investigated to see if any cradle adjust is necessary in accordance with the foregoing descriptions of FIG. 5. If cradle adjust appears to be necessary and if the operator desires to adjust the cradle, it is done as described for FIG. 5. At this point the steering axis inclination included angle and camber are displayed having values as though the vehicle was set down on an underlying surface and the values are adjusted in the raised or elevated condition while using the "set down" readings.

If included angle is fixed, which is the most usual case, then included angle is displayed as fixed and steering axis inclination and camber are displayed as live values. A live value in a display is a value which will change on the display as adjustment is made to the value. A frozen or fixed value is a value which will not change on the alignment value display when adjustment is made. If the included angle is adjustable, the display will show the steering axis inclination as fixed and the included angle and camber as live values. Thereafter, the adjustments are made. The steering axis inclination and included angle and camber values after adjustment are stored. The vehicle is then lowered to rest on the underlying surface and the change in the camber value from raised to lowered is observed. If there is a change between the raised and the lowered value due to lowering the vehicle to the underlying surface, the change should be taken into account to correct the steering axis inclination and camber readings since it is the latest information available. If as a result of such correction an alignment quantity is placed out of specification, there is an option to repeat the elevated measurement adjustment routine using lowered values or to adjust the alignment quantities with the vehicle in a lowered condition.

Figures 7, 7A, 8, 8A, 9, 9A:
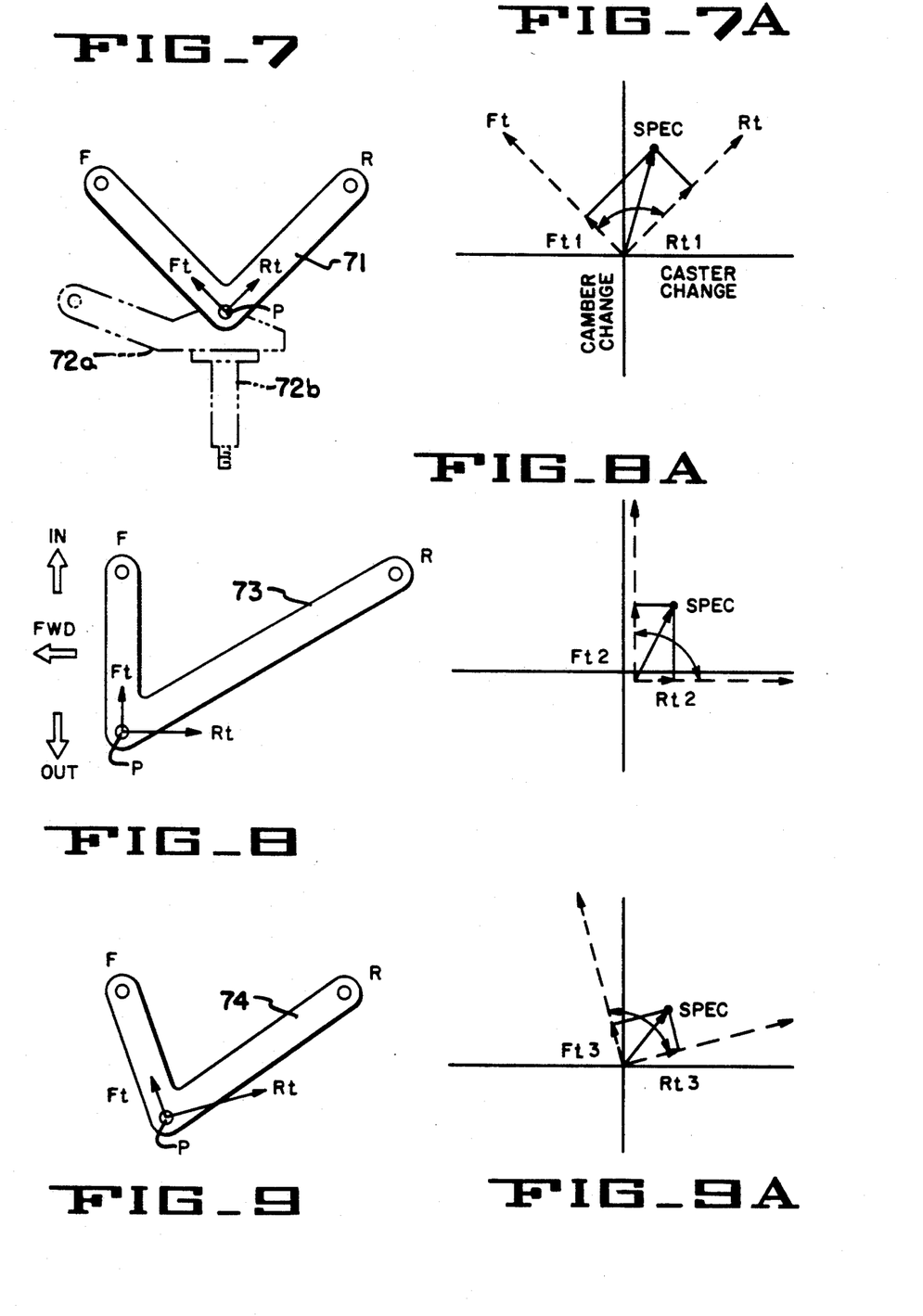
FIG. 7 is a diagram of a symmetrical wheel assembly supporting member.
FIG. 7A is a graph corresponding to the wheel assembly support member of FIG. 7.
FIG. 8 is a diagram of a different wheel assembly supporting member.
FIG. 8A is a graph which relates to the wheel assembly supporting member of FIG. 8.
FIG. 9 is a diagram of yet another wheel assembly supporting member.
FIG. 9A is a graph which relates to the wheel assembly supporting member of FIG. 9.

With reference now to FIG. 7 a suspension member 71 is shown which carries a wheel assembly on a steering knuckle 72a and spindle 72b shown in phantom lines. A wheel assembly mounts on the spindle 72b and the top of the steering axis as seen in FIG. 7 is represented by the point P. A forward end F and a rearward end R of the support member 71 is shown. The member 71 is commonly referred to as an "A" arm and is of symmetrical shape as seen in FIG. 7. A change in adjustment at point F by insertion or removal of shims between the vehicle and the member 71 at the point F will result in the point P moving in the direction Ft. In like fashion, addition of removal of shims at adjustment point R will move the point P in the direction Rt. FIG. 7A shows a graph of camber change as a function of caster change showing the movement Ft and Rt for exclusive adjustments at F or at R respectively. It is known that these motions are approximately 90 degrees apart. If it is desired to obtain a camber change and a caster change represented by the point on the graph of FIG. 7A labelled "SPEC", it is then known that an adjustment may be made of Ft1 and Rt1 to obtain the desired camber and the desired caster.

In like fashion the "A" arm 73 of FIG. 8 having the point P on the steering axis of a supported wheel assembly will move the point P in the direction of Ft for shim adjustments inwardly at point F and in the direction of Rt for shim adjustments inward at point R. Directions for "in", "out" and "forward" are shown for FIG. 8 an apply similarly for FIGS. 7 and 9. As a result the graph of FIG. 8A shows the adjustments and affect on camber change and effect on caster change explained for FIG. 7A. In like fashion, for a caster and camber change represented by the point "SPEC" in the graph of FIG. 8A, adjustments must be made at points F and R of the "A" arm 73 to affect the change Ft2 and Rt2 as seen in FIG. 8A.

In FIG. 9 an "A" arm 74 of yet another configuration is seen. The configuration of "A" arm 74 will provide for travel in the directions of Ft and Rt for adjustments at points F and R respectively. To reach a camber and caster change represented by the point "SPEC" in the graph of FIG. 9A, it will be necessary to adjust the point F inward to affect the movement of point P through the distance Ft3 and to move point R inward to affect the movement of point P through the distance Rt3.

The foregoing recognizes that because the responses to adjustment are displaced by 90° as seen in FIGS. 7 through 9A, response from adjusting a wheel assembly supporting member such as an "A" arm at one adjuster (F or R) may be used to predict the affect of adjustment at the other adjuster (R or F). By making some degree of movement of either adjuster, response of the suspension is measured and the system disclosed herein calculates a predicted response for the other adjuster. These predicted responses are then used to guide an operator through the adjustment process for caster and camber in spite of the fact that the adjusters have interdependent affects on the caster and the camber angles to be corrected. For example, referring to FIG. 7A an operator is informed that an adjustment (i.e., shim size or cam adjustment) must be made at F to obtain suspension shift through Ft1 and another adjustment must be made at R to obtain suspension shift Rt1. As a consequence, the method disclosed requires that caster and camber be measured continuously and that one of the adjusters be moved and the effects be monitored by the alignment system disclosed herein. The alignment system thereafter predicts the effects of the other adjuster and calculates the necessary movements for each adjuster (i.e., shim size) that will result in the setting of the suspension to the specified or specification value. As an additional example, with regard to the supporting member 74 of FIG. 9, an adjustment inwardly at point F of Ft3 and an adjustment inwardly at point R of Rt3 are necessary to arrive at the desired point, "SPEC". The operator is guided through the proper adjustments by the system display so that he may obtain the "SPEC" value for caster and camber on the first attempt of distinct adjustments, one at F and one at R. The sensor outputs are monitored during the adjustment and compared to the predicted outputs. If they are as predicted, or within acceptable tolerance therefrom, the procedure is allowed to go ahead. If the comparison indicates a likely error will occur, the operator is warned and guided to recover from the error. The described technique is useable with suspensions having adjustable lower control arms as wheel support members although adjustment may produce opposite polarity responses.

Figure 10:
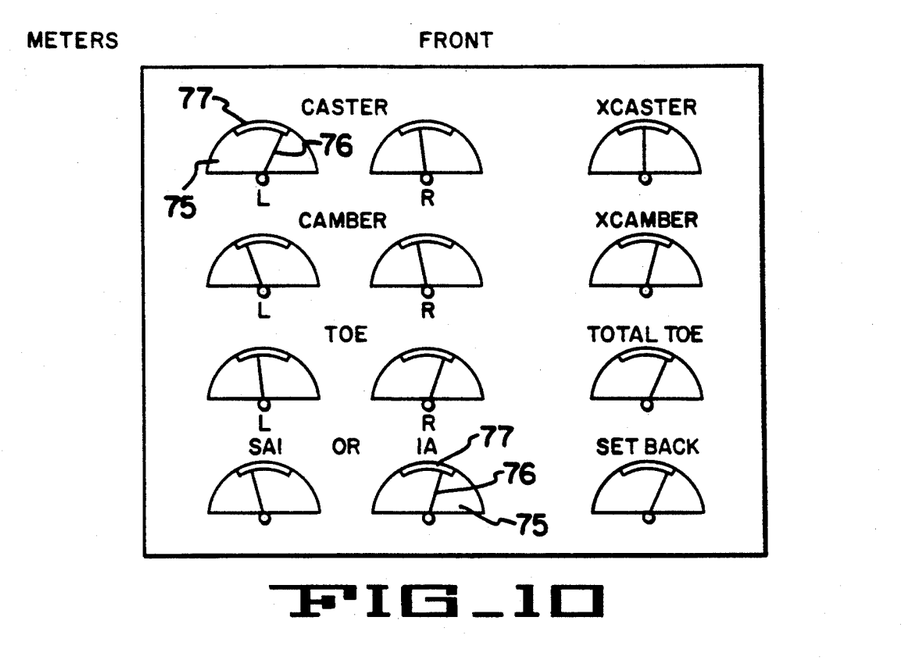
FIG. 10 is illustrative of a wheel alignment measurement display.
Figure 11:
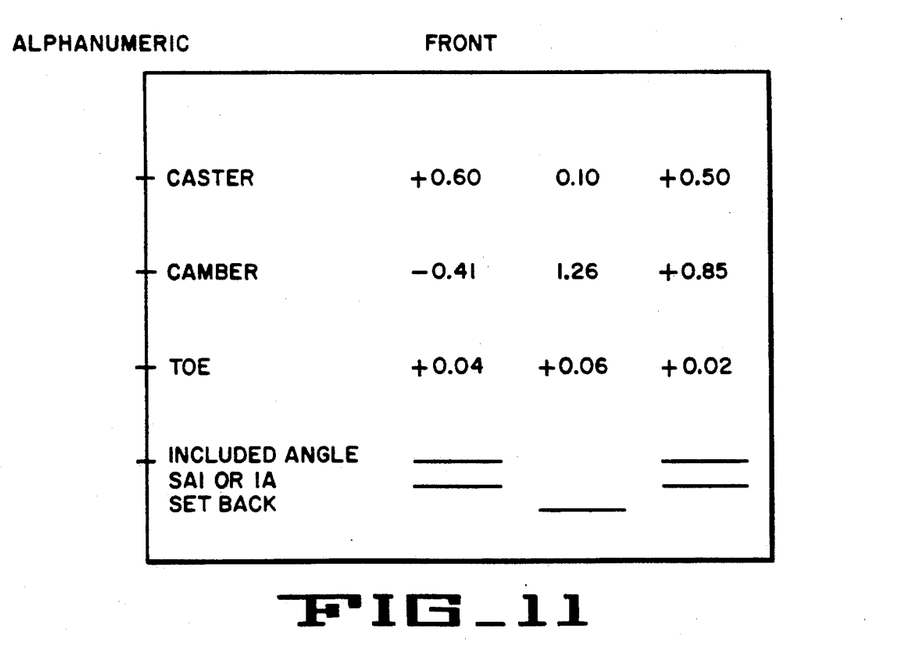
FIG. 11 is another diagram illustrative of a wheel alignment measurement display.
Figure 12:
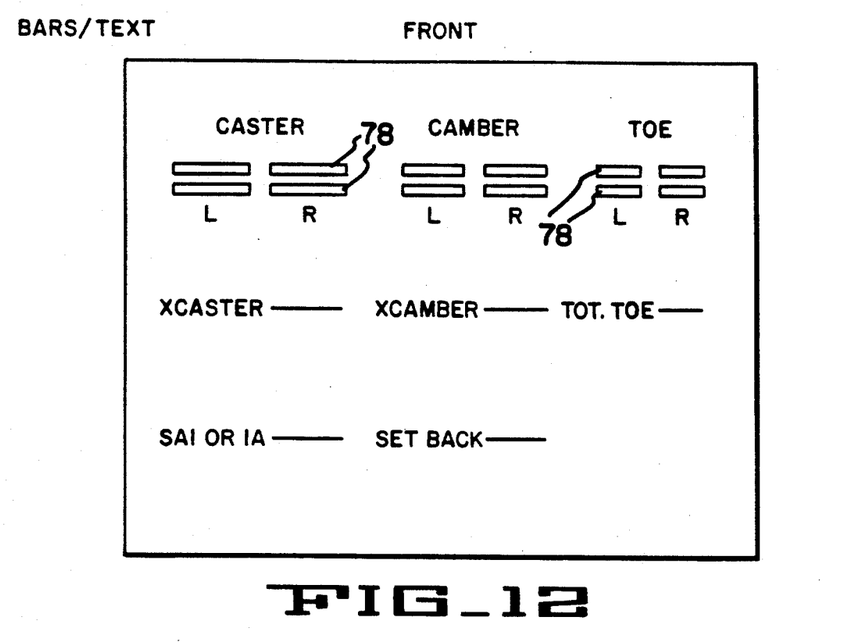
FIG. 12 is yet another diagram illustrative of a wheel alignment measurement display.

Turning now to FIGS. 10-13 of the drawings, various depictions of the display for the wheel alignment system disclosed herein are presented. In FIG. 10, depictions of meters 75 are provided on the display which are labelled for the appropriate alignment quantity, caster, camber, toe, SAI, IA, etc. having a meter pointer 76 and a heavy colored line 77 to illustrate the acceptable range on the meter for the adjustment. As seen in FIG. 10, all quantities including cross caster, cross camber, total toe and set back are shown for the front wheels of the vehicle and all values are shown as live values or values which will change with adjustment of the quantity as will the value of any interdependent quantity. FIG. 11 carries the same information as the display of FIG. 10, except that the alignment information is presented on the display in alpha-numeric form as shown. In FIG. 12, a display is shown wherein the same information is provided as in the displays of FIGS. 10 and 11 except that the information is shown using alignable light bars 78 and text. In each of the displays of FIGS. 10, 11 and 12 the alignment quantities are all live quantities.

Figure 13:
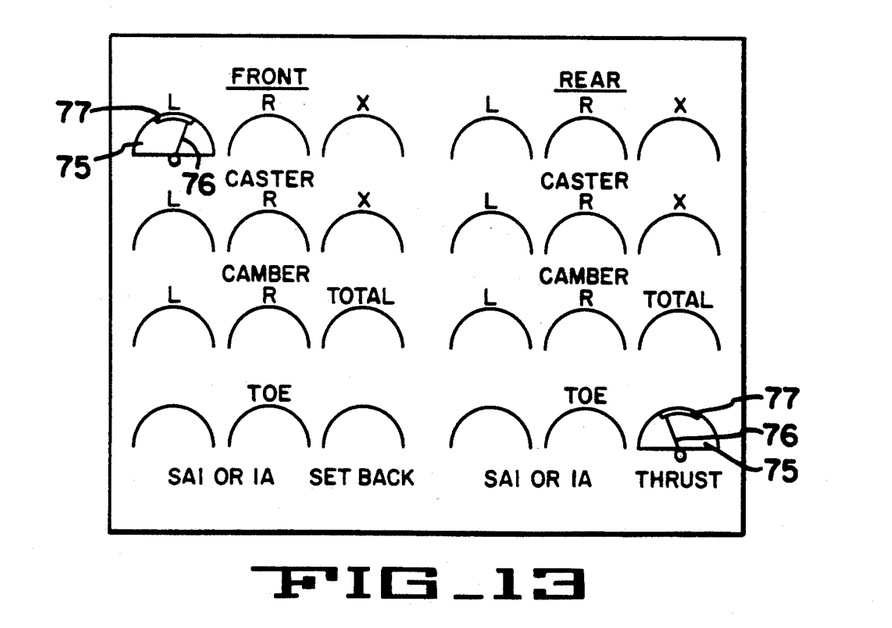
FIG. 13 is still another diagram illustrative of a wheel alignment measurement display.

In the display depiction in FIG. 13 of the drawings, alignment quantities for a vehicle with front and rear steerable wheels are shown using the meter format (items 75, 76 and 77) of FIG. 10 wherein caster, camber, toe, steering axis inclination or included angle, cross caster, cross camber and total toe are shown for front and rear wheel pairs. Set back is displayed for the front wheels and thrust angle is shown for the rear wheels in FIG. 13. All values depicted in the display of FIG. 13 are live values subject to change upon adjustment of the alignment characteristic itself or any interdependent alignment characteristic.

Although the best mode contemplated for carrying out the present invention has been herein shown and described, it will be apparent that modification and variation may be made without departing from what is regarded to be the subject matter of the invention.

What is claimed is:

1. A wheel alignment system for measuring alignment angles of wheels which support a vehicle on a running surface, comprising system function control means for providing system operating instructions and for receiving alignment angle data, angle sensing means mounted on at least two of the vehicle support wheels for providing angle measurement signals indicative of the angle between the planes of the support wheels and a reference direction, said angle sensing means further comprising fast response signal amplitude sampling means for providing substantially instantaneous toe angle measurement signal detection, whereby data update frequency is increased and angle sensing accuracy is improved, sensor and system interface control means for receiving and preprocessing said angle measurement signals and external system control inputs and for providing bi-directional data flow between said angle sensing means and said system function control means, and graphics array control and display means for receiving and displaying measured alignment angle data.

2. A wheel alignment system for measuring alignment angles of wheels which support a vehicle on a running surface, comprising system function control means for providing system operating instructions and for receiving alignment angle data, angle sensing means mounted on at least two of the vehicle support wheels for providing angle measurement signals indicative of the angle between the planes of the support wheels and a reference direction, said angle sensing means further comprising improved response toe angle sensing means for providing substantially instantaneous angle measurement signal detection, whereby data update frequency is increased and angle sensing accuracy is improved, sensor and system interface control means for receiving said angle measurement signals and external system control inputs and for providing bi-directional data flow between said angle sensing means and said system function control means, and graphics array control and display means for receiving and displaying measured alignment angle data, wherein said angle sensing means comprises means for projecting a plurality of light beams having a predetermined carrier frequency at known successive time intervals and in known orientation relative to the plane of one of the at least two support wheels, light beam receiving means mounted in known orientation relative to the plane of the other one of the at least two support wheels and in the path of the plurality of light beams, whereby an angle signal output is provided upon reception of ones of said plurality of light beams, high pass filter means connected to receive said angle signal output, said high pass filter having a pass band substantially above ambient light noise frequencies and including said carrier frequency whereby said angle output signal is passed substantially noise free, means for detecting said substantially noise free angle output signal and for storing a signal indicative of the amplitude thereof, and control means for receiving said stored signal indicative of amplitude an for erasing said stored signal before the next successive projected light beam is sensed by said light beam receiving means.

3. The wheel alignment system of claim 2 comprising variable amplification means connected to said control means and between said high pass filter means and said means for detecting for changing gain to provide a stored signal indicative of amplitude which is within predetermined amplitude limits.

4. The wheel alignment system of claim 2 wherein said means for detecting comprises means for obtaining and storing a substantially complete amplitude signal in less than 250 microseconds, whereby frequent signal updates may be obtained thereby assuring accurate angle sensing.

5. The wheel alignment system of claim 4 wherein said control means comprises an analog to digital converter for digitizing said stored signal indicative of amplitude and wherein said frequent signal updates provide minimal signal amplitude change between adjacent updated signals, whereby said digitized stored signal contains additional bits for higher toe angle accuracy.

6. A toe angle signal sensing system for detecting toe angle of a wheel pair supporting a vehicle for running on an underlying surface, wherein a plurality of light beams having a predetermined carrier frequency are projected at known successive times and at known angles to the plane of one of the wheel pair, and a light beam receiver is mounted in known position and in the path of the plurality of light beams and producing an angle signal output indicative of reception of ones of the light beams, comprising high pass filter means connected to receive said angle signal output and having a pass band substantially above ambient light noise frequencies and including the carrier frequency for providing a high pass output relating to said angle signal output, means for detecting said high pass output and for storing a signal indicative of the amplitude thereof, and control means for receiving and for erasing said stored signal indicative of amplitude before the next successive light beam is sensed by the light beam receiver.

7. The toe angle signal sensing system of claim 6 comprising variable amplification means connected to said control means and between said high pass filter and said means for detecting for changing gain to provide a stored signal indicative of amplitude which is within predetermined amplitude limits.

8. The toe angle signal sensing system of claim 6 wherein said means for detecting comprises means for obtaining and storing a substantially complete amplitude signal in less than 250 microseconds, whereby frequent signal updates may be obtained to provide accurate angle measurement.

9. The toe angle signal sensing system of claim 8 wherein said control means comprises an analog to digital converter for digitizing said stored signal and wherein said frequent signal update provides for minimal signal change between adjacent updated signals, whereby said digitized stored signal contains additional bits for higher toe angle signal accuracy.

10. The toe angle signal sensing system of claim 6 wherein said means for detecting comprises means for providing said signal indicative of amplitude as a substantially square wave signal.

11. A method of adjusting the rolling direction of a pair of wheels to a predetermined angle, wherein the wheels are connected by a solid axle supported by a pair of spaced spring assemblies attached to the axle by shackles extending through holes in a pair of shackle plates, comprising the steps of measuring the wheel rolling direction angle, calculating an adjustment angle between the measured wheel rolling direction and the predetermined wheel rolling direction, measuring the distance between the spaced spring assemblies, and computing an elongation dimension and direction for the holes in the shackle plate as the product of the distance and the sine of the adjustment angle.

12. The method of claim 11 comprising the steps of elongating the holes by one half the elongation dimension in opposing directions in each of the shackle plates.

13. A method for simultaneously adjusting camber and caster of a wheel on a vehicle to a specified value, wherein the wheel assembly is pivotally carried on the vehicle by a member having a particular geometry which is attached to the vehicle body at forward and rear adjustable attachment points, and wherein measurement instruments provide wheel caster and camber measurements, comprising the steps of initially adjusting the position of one of the forward and rear adjustable attachment points, sensing the effect of the step of initially adjusting on camber and caster measurement, predicting the effect of subsequent adjustment at the other of the forward and rear adjustable attachment points by using the effect from the sensing step, and calculating the adjustments at each of the forward and rear adjustable attachment points to obtain the specified values of wheel caster and camber for any particular geometry of the member which pivotally carries the wheel.

14. The method of claim 13 wherein the step of sensing the effect is continuous, comprising the steps of adjusting the forward and rear adjustable attachment points to obtain the specified values of wheel caster and camber, monitoring the sensed caster and camber values during the step of adjusting, comparing the sensed caster and camber values obtained during the step of monitoring with the values corresponding to the calculated adjustments to obtain the specified values, and indicating when the step of comparing shows an error between the monitoring step values and the calculating step values.

15. The method of claim 14 comprising the steps of identifying the error, and providing instructions for rectifying the error.

16. The method of claim 13 comprising the step of storing information gained during the step of predicting, whereby different wheel assemblies having similar members for pivotally carrying the wheel assembly are adjusted simultaneously in caster and camber without the step of initially adjusting.

17. The method of claim 13 wherein the member for pivotally carrying the wheel assembly has a lower ball joint connection, comprising the step of changing the adjustment polarity assignments relative to polarity assignments when the member has an upper ball joint connection.

18. A method of adjusting alignment of a laterally disposed pair of independent suspended wheels on a vehicle, wherein the wheels have alignment measurement instruments in communication therewith for measuring wheel alignment characteristics of the pair of wheels and wherein the wheels are carried by support structure connected together by a rigid member extending therebetween, comprising the steps of
measuring the camber and steering axis inclination alignment characteristics for each of the pair of wheels,
comparing the measured alignment characteristics for each wheel of the pair for indication of lateral shift of the rigid member, and
adjusting the lateral position of the rigid member in the direction which moves steering axis inclination and camber measurements on both of the pair of wheels toward specification values if indication exists that the rigid member has shifted.

19. A method of adjusting steering axis inclination, included angle and camber of a wheel suspended from and supporting a vehicle for running on an underlying surface while the wheel is raised above the underlying surface, wherein alignment measurement instruments are coupled to the wheel for providing alignment angle output, and wherein brakes are locked and the alignment measurement instruments are locked to prevent rotation relative to the wheel during known portions of the process, comprising the steps of
steering the wheel straight ahead,
storing the camber measurement output while the vehicle is set down on the underlying surface,
raising the vehicle above the underlying surface,
measuring the camber output when the vehicle is raised,
calculating the difference between the camber outputs with the vehicle lowered and raised,
steering the wheel through a known angle in a left direction,
storing the steering axis inclination alignment angle left turn output,
steering the wheel through a known angle in a right direction,
storing the steering axis inclination angle right turn output,
calculating the steering axis inclination angle from the left and right turn outputs,
calculating a modified steering axis inclination angle output using the difference between camber outputs lowered and raised,
storing the modified steering axis inclination angle output, and
adjusting camber and steering axis inclination outputs in the raised condition using the stored modified steering axis inclination output and the stored camber measurement output obtained when the wheel was set down.

20. The method of claim 19 wherein the wheel has a laterally disposed additional wheel and alignment measurement instruments forming a wheel pair with support structure therebetween including a laterally extending rigid member, comprising the steps of
comparing the camber and steering axis inclination outputs for each of the wheels in the wheel pair for indication of lateral shift of the rigid member, and
adjusting the lateral position of the rigid member in the direction which moves steering axis inclination and camber outputs on both of the pair of wheels toward specified values of output if indication exists that the rigid member has shifted.

21. The method of claim 19 comprising the steps of
lowering the vehicle until it is supported on the underlying surface following the step of adjusting camber and steering axis inclination outputs in the raised condition,
calculating the difference between the adjusted outputs in the raised condition and the outputs after the vehicle is lowered, and
displaying the differences.

22. The method of claim 21 comprising the steps of readjusting steering axis inclination and camber in the lowered condition if the difference between the outputs in the raised and lowered conditions is greater than a predetermined amount.

23. The method of claim 19 wherein the included angle is adjustable and wherein the steps of storing steering axis inclination alignment angle left turn and right turn outputs comprises the step of storing included angle left and right turn outputs and wherein the steps of calculating steering axis inclination angle and modified steering axis inclination angle comprises the step of calculating included angle and modified included angle and the step of adjusting camber and steering axis inclination outputs in the raised condition comprises the step of adjusting camber and included angle outputs in the raised condition.

24. The wheel alignment system of claim 1 wherein said graphics array control and display means comprises
means for generating live display indicia of alignment quantities for caster, camber, toe, cross caster, cross camber, total toe, steering axis inclination and wheel setback, whereby changes made by adjustment to any quantity and resulting change in another quantity will be displayed.

25. The wheel alignment system of claim 1 wherein said graphics array control and display means comprises
means for generating and displaying live display indicia of alignment quantities for front and rear caster, cross caster, camber and cross camber, toe and total toe steering axis inclination, steerable wheel setback and drive wheel thrust line, whereby changes made by adjustment to any of the alignment quantities and resulting change in others of the alignment quantities are displayed.

26. The wheel alignment system of claim 24 wherein said live display indicia comprises displayed meter indicia.

27. The wheel alignment system of claim 24 wherein said live display indicia comprises displayed alphanumeric indicia.

28. The wheel alignment system of claim 24 wherein said live display indicia comprises displayed adjustment bars and text.

29. The wheel alignment system of claim 25 wherein said live display indicia comprises displayed meter indicia.

30. The wheel alignment system of claim 25 wherein said live display indicia comprises displayed alphanumeric indicia.

31. The wheel alignment system of claim 25 wherein said live display indicia comprises displayed adjustment bars and text.

32. An alignment system display for showing alignment characteristics of wheels on a vehicle, comprising
a graphics array control means, and
means for providing a live display of all quantities being aligned connected to said graphics array control means, whereby all current changes in quantities relating to alignment characteristics caused by alignment adjustment are displayed.

33. The alignment system display as in claim 32 wherein said means for providing a live display comprises means for providing displayed meter indicia.

34. The alignment system as in claim 32 wherein said means for providing a live display comprises means for providing alphanumeric indicia.

35. The alignment system as in claim 32 wherein said means for providing a live display comprises means for providing adjustment bars and textual material indicia.

36. The alignment system as in claim 32 wherein said means for providing a live display comprises means for displaying individual wheel front toe, individual wheel rear toe, individual wheel front camber, individual wheel front caster, individual wheel rear camber, individual wheel rear caster, individual front wheel total toe, individual rear wheel total toe, front wheel setback and rear wheel thrust angle.

* * * * *

UNITED STATES PATENT AND TRADEMARK OFFICE
CERTIFICATE OF CORRECTION

PATENT NO. : 5,208,646
DATED : May 4, 1993
INVENTOR(S) : Rogers, et. al.

It is certified that error appears in the above-indentified patent and that said Letters Patent is hereby corrected as shown below:

On the Title page, item [75], Inventors: should read as follows:

--Steven W. Rogers; James L. Dale, Jr.; M. Todd Foreman; Handford D. Monroe; Carl W. Pruitt; C. Sherman Paul, all of Conway, Ark--.

Signed and Sealed this

Seventeenth Day of August, 1993

Attest:

BRUCE LEHMAN

Attesting Officer

Commissioner of Patents and Trademarks